(12) United States Patent
Johnson et al.

(10) Patent No.: US 6,692,351 B2
(45) Date of Patent: Feb. 17, 2004

(54) CROP RESIDUE CHOPPER WITH RECONFIGURABLE FIXED OFFSET BLADES

(75) Inventors: Orlin W. Johnson, Geneseo, IL (US); Robert A Matousek, Milan, IL (US); Joshua J. Wolters, Geneseo, IL (US); Jason Hull, Skidmore, MO (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/196,791

(22) Filed: Jul. 17, 2002

(65) Prior Publication Data

US 2004/0014511 A1 Jan. 22, 2004

(51) Int. Cl.$^7$ ................................................ A01F 12/40
(52) U.S. Cl. ........................................ 460/112; 56/500
(58) Field of Search ................................ 460/112, 111, 460/901; 56/500, 504, 505; 241/243

(56) References Cited

U.S. PATENT DOCUMENTS

| | | | | |
|---|---|---|---|---|
| 2,842,175 A | | 7/1958 | Thompson | 146/123 |
| 3,350,017 A | * | 10/1967 | Howell et al. | 239/660 |
| 3,465,507 A | * | 9/1969 | Fishaw | 56/294 |
| 3,604,188 A | * | 9/1971 | Mott | 56/294 |
| 3,658,265 A | | 4/1972 | Johnson | 241/190 |
| 3,670,739 A | * | 6/1972 | Rowland-Hill | 460/66 |
| 3,874,604 A | | 4/1975 | Gronberg et al. | 241/243 |
| 4,056,107 A | * | 11/1977 | Todd et al. | 460/112 |
| 4,998,679 A | | 3/1991 | Bender | 241/243 |
| 5,042,973 A | | 8/1991 | Hammarstrand | 460/112 |
| 5,272,861 A | | 12/1993 | Roynberg | 56/504 |
| 5,482,508 A | | 1/1996 | Redekop et al. | 460/112 |
| 6,113,491 A | * | 9/2000 | Holmen | 460/111 |
| 6,478,674 B2 | * | 11/2002 | Redekop | 460/112 |
| 6,511,374 B2 | * | 1/2003 | VanEe | 460/112 |

* cited by examiner

Primary Examiner—Árpád Fab Kovács
(74) Attorney, Agent, or Firm—John William Stader; Collin A. Webb

(57) ABSTRACT

A crop residue chopper for an agricultural combine including a spaced array of stationary knives. A rotor of the chopper is rotatable about an axis therethrough and includes mounting elements in axially spaced relation, and a plurality of offset knives, each of the offset knives including a mounting end portion fixedly mountable on one of the mounting elements and a an opposite free end portion disposed so as to extend radially outwardly in axially offset relation to the mounting end portion when mounted on the mounting element. The offset knives are mountable in pairs on the mounting elements in a fine chopping configuration wherein the free end portions of the knives of each of the pairs are offset in a predetermined first relation to the mounting ends thereof, respectively, and define a space between the free end portions having a predetermined first axial extent for passage of the offset knives of each of the pairs on opposite sides of one of the stationary knives when the rotor is rotated for performing a fine cutting function. Alternatively, selected ones of the offset knives are mountable singly on the mounting elements in a predetermined coarse chopping configuration with the free end portions of the selected ones of the knives offset in an opposite direction from when in the fine chopping configuration so as to define axial spaces between adjacent ones of the free end portions having a predetermined second axial extent greater than the first axial extent for passage in proximity to at least one of the stationary knives when the rotor is rotated, for performing a coarse cutting function.

11 Claims, 4 Drawing Sheets

CROP RESIDUE CHOPPER WITH RECONFIGURABLE FIXED OFFSET BLADES

TECHNICAL FIELD

This invention relates generally to a crop residue chopper for an agricultural combine, and more particularly to a chopper for receiving crop residue, primarily straw, stalks, and other plant material, from threshing mechanism of the combine, and chopping the residue and propelling it outwardly from the combine, the chopper utilizing a rotatable rotor having knives fixedly mountable thereon in alternative configurations for finely chopping the residue, or more coarsely chopping the residue, as desired.

BACKGROUND ART

Due to the differences in farming practices and preferences, some farmers and operators require or desire straw and other crop residue discharged from the threshing mechanism of a combine to be cut or chopped very finely, while others prefer the residue to be more coarsely cut or chopped. It is well known to provide a chopper on a combine for receiving crop residue output from the threshing or separating mechanism of the combine. Typically, such choppers include a rotatable rotor supporting a plurality of knives for rotation therewith, which knives pass between a plurality of stationary knives for cutting or chopping the crop residue received as the rotor is rotated. To produce coarser cut crop residue, the knives on the rotor are typically fixedly mounted thereon, and are in a one-to-one ratio to the stationary knives. For a finer cut, pivotable flail type knives are typically used on the rotor, in a ratio of two-to-one to the stationary knives. A disadvantage, however, of a flail knife rotor compared to a fixed knife rotor is the additional cost for the pivotal mounting apparatus for the knives, such as bushings, bearings or the like. It has also been found that flail knife rotors tend to be less reliable than fixed knife rotors due to problems relating to wear of the pivoting components. Flail knives has also been known to produce more vibration than fixed knives, when rotated. Still further, due to the differences between flail knife and fixed knife constructions, providing a rotor configured to alternatively use both for providing a fine cutting capability and a coarse cutting capability has been found to be undesirably costly.

Therefore, what is sought is a crop residue chopper for an agricultural combine which can be alternatively configured for finely and coarsely chopping crop residue utilizing only fixed knives on the rotatable rotor thereof, so as to be less costly, more reliable, and produce less vibration than known constructions using flail knives.

SUMMARY OF THE INVENTION

According to the present invention, a rotor for a crop residue chopper for an agricultural combine for rotation about a rotational axis extending through the rotor adjacent to an axially spaced array of stationary knives of the chopper, which provides many of the above sought features, is disclosed. The present rotor preferably includes a plurality of mounting elements supported in predetermined axially spaced relation one relative to another, and a plurality of offset knives, each of the offset knives including a mounting end portion fixedly mountable on one of the mounting elements and a free end portion opposite the mounting end portion disposed so as to extend radially outwardly in axially offset relation to the mounting end portion when mounted on the mounting element, the offset knives being mountable in-pairs on the mounting elements in a predetermined fine chopping configuration wherein the free end portions of the knives of each of the pairs are offset in a predetermined first relation to the mounting ends thereof, respectively, and define a space between the free end portions having a predetermined first axial extent so as to be capable of passing on opposite sides of predetermined ones of the stationary knives and performing a cutting function in cooperation therewith when the rotor is rotated, and selected ones of the offset knives being mountable singly on the mounting elements in a predetermined coarse chopping configuration with the free end portions of the selected ones of the knives offset in an opposite direction from when in the fine chopping configuration so as to define axial spaces between adjacent ones of the free end portions having a predetermined second axial extent greater than the first axial extent for passage in proximity to predetermined ones of the stationary knives for performing a cutting function in cooperation therewith when the rotor is rotated.

Preferably, when in the fine chopping configuration, the free end portions of the offset knives of each pair extend radially outwardly in diverging relation, such that when handling larger, harder items of crop residue, such as corn cobs, the cobs will not have a tendency to become lodged between the knives. In the coarse chopping configuration, preferably alternating ones of the stationary knives are removed.

DETAILED DESCRIPTION OF THE INVENTION

Figure 1:
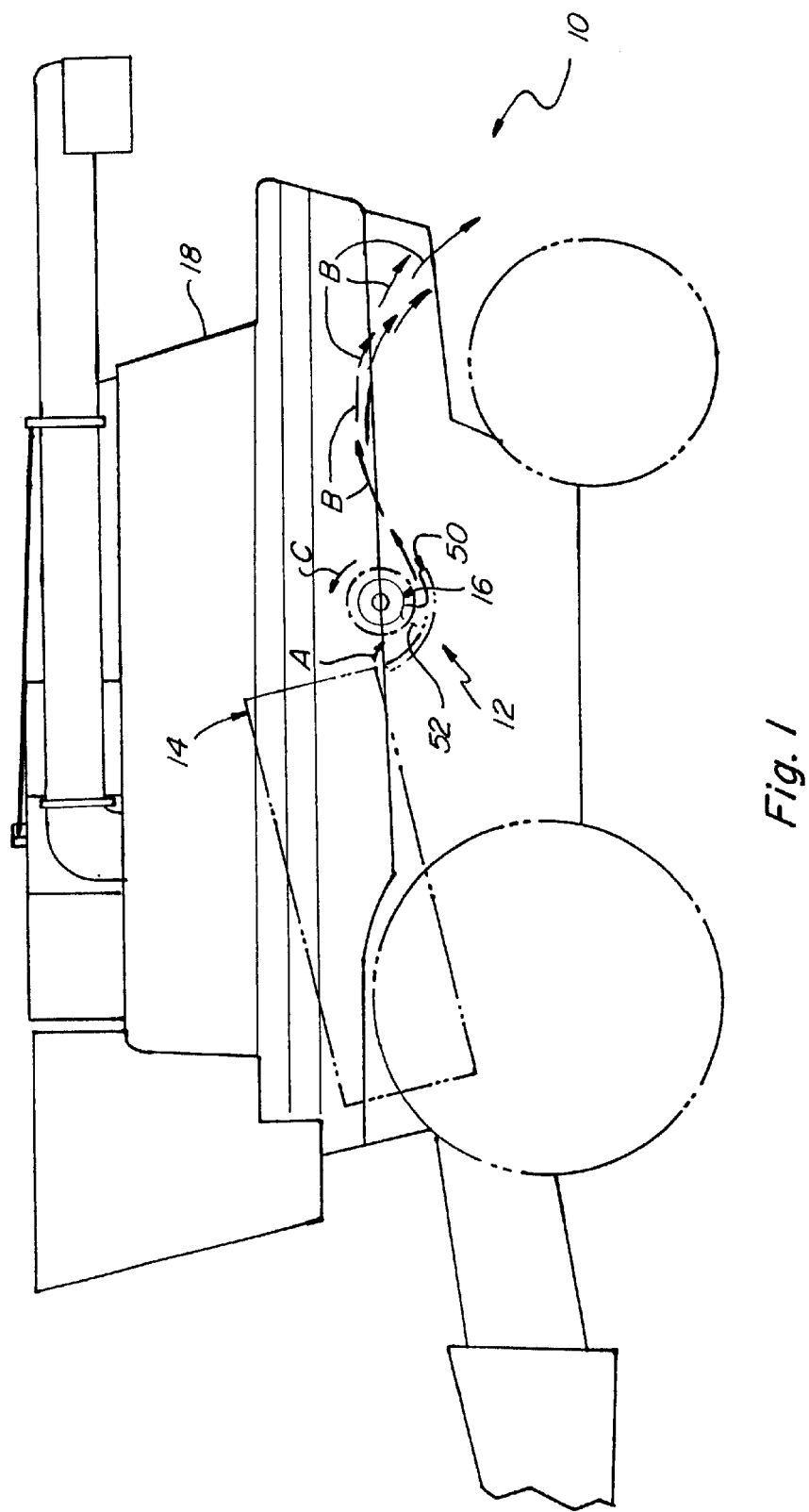
FIG. 1 is a fragmentary, simplified side elevational representation of an agricultural combine including a crop residue chopper according to the present invention.

Referring now to the drawings, wherein preferred embodiments of the present invention are shown, in FIG. 1, a typical prior art self-propelled agricultural combine 10 is shown, including a rotary crop residue chopper 12 constructed and operable according to the teachings of the present invention for receiving a flow of straw and other crop residue from a rotary threshing mechanism 14 of combine 10, as denoted by arrows A, and chopping and cutting the straw and other residue and propelling it outwardly from combine 10, as denoted by arrows B, by rotation of chopper, as denoted by arrow C.

Figure 2:
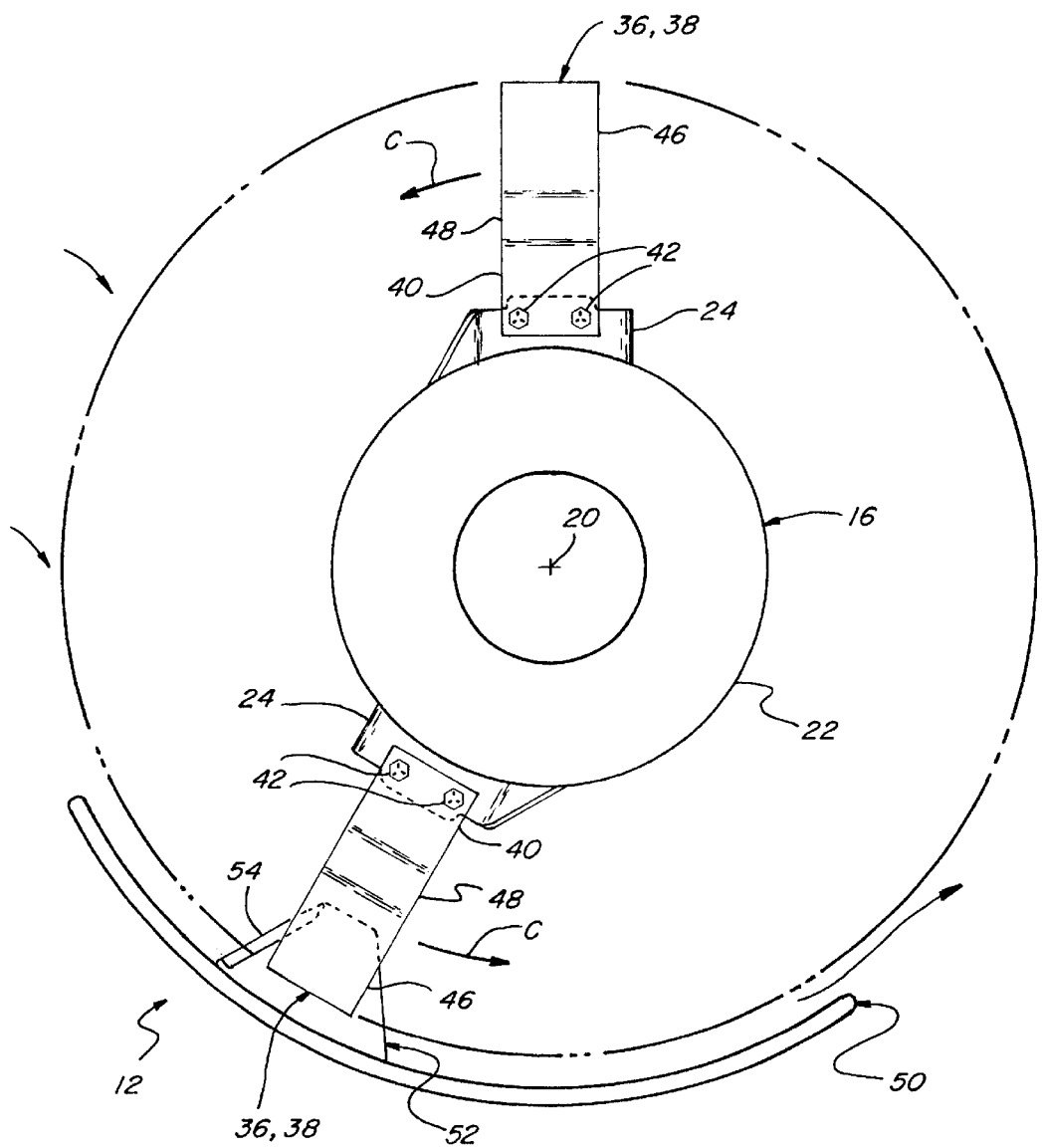
FIG. 2 is an enlarged side elevational representation of the chopper of FIG. 1.
Figure 3:
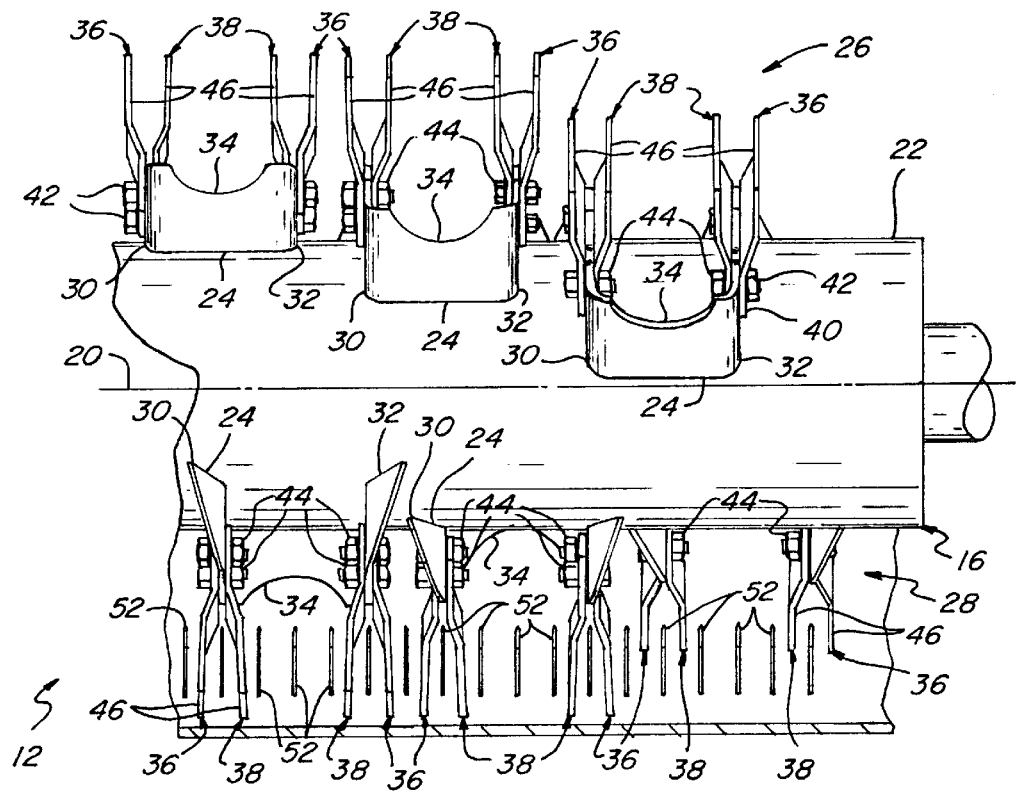
FIG. 3 is an enlarged fragmentary rear view of the chopper of FIG. 1.

Referring also to FIGS. 2 and 3 wherein chopper 12 is shown, chopper 12 includes an elongate cylindrical rotor 16 supported within a housing 18 of combine 10 (FIG. 1) for rotation in a predetermined rotational direction, as denoted by arrow C, about a rotational axis 20 extending longitudinally through rotor 16. Rotor 16 can be suitably supported for such rotation by bushings, bearings, or the like, and is rotatable using any suitable rotatable power source, including, but not limited to, a belt or shaft drive connected to an engine of combine 10, a fluid motor, or the like (not shown), in the well known conventional manner. Rotor 16 includes an outer cylindrical surface 22 having a plurality of U-shape mounting brackets 24 mounted thereon in two diametrically opposed helical arrays 26 and 28, each array extending substantially the length of rotor 16, as suggested in FIG. 3. Each bracket 24 includes a pair of legs 30 and 32 extending circumferentially across a portion of outer cylindrical surface 22, and a connecting portion 34 extending axially between legs 30 and 32.

Figure 4:
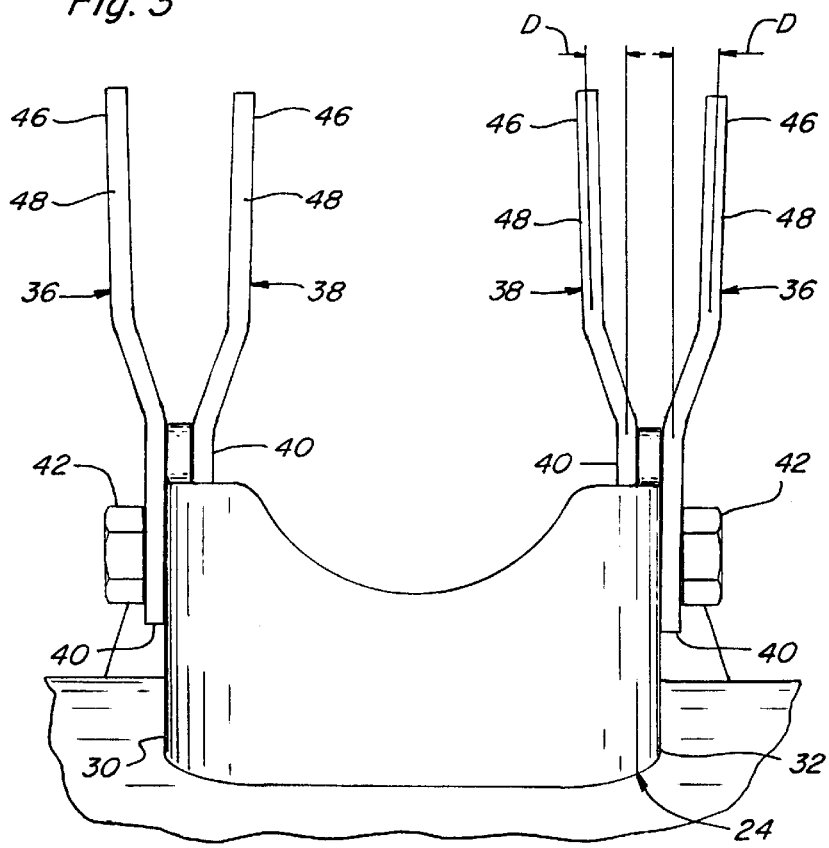
FIG. 4 is an enlarged fragmentary rear view of a rotor of the chopper of FIG. 1, showing knives mounted thereon in a first configuration.

Referring also to FIG. 4, the configuration shown is a fine chopping configuration, wherein each leg 30 and 32 of each bracket 24 includes an adjacent pair of offset knives 36 and 38 fixedly mounted in abutment to oppositely facing inner and outer surfaces of bracket 24 so as to extend radially outwardly therefrom in spaced, opposed relation as shown. Each knife 36 and 38 includes a mounting end 40 which is fixedly mounted to leg 30 or 32 by a pair of bolts 42 which pass through holes (not shown) in mounting end 40 and leg 30 or 32 and are secured in place by nuts 44. Each knife 36 and 38 includes a free end portion 46 opposite mounting end portion 40. Importantly, each knife 36 and 38 has a longitudinal shape between mounting end portion 40 and free end portion 46 which positions free end portion 46 in axially offset relation to mounting end portion 40 when the knife is mounted to bracket 24, hence the name. More particularly, in the fine chopping configuration shown, free end portion 46 of each offset knife 36 and 38 is axially offset in a predetermined axial direction from mounting end portion 40 thereof, by a predetermined axial distance, as denoted at D (FIG. 4), with free end portions 46 of knives 36 and 38 of each pair offset in opposite axial directions, away from one another. In addition, it should be noted that free end portions 46 of each pair of knives 36 and 38 extend divergingly one relative to the other from mounting end portions 40 thereof. These offset and diverging relationships are important as will be explained below. Each knife 36 and 38 includes a leading cutting edge 48 facing in the direction of rotation C.

Referring more particularly again to FIGS. 1 and 2, chopper 12 includes a concave plate 50 disposed beneath and extending substantially the axial length of rotor 16, in closely spaced relation to free end portions 46 of knives 36 and 38 when at a rotational position below rotor 16, as illustrated. Plate 50 supports an axially extending spaced array of stationary knives 52, each knife 52 being positioned so as to be located between a correspondingly located pair of knives 36 and 38 on rotor 16 as it is rotated about rotational axis 20, for performing a cutting function, namely chopping or cutting any crop residue, such as straw or the like (arrows A) which is received and carried by the pair of knives 36 and 38 into contact with a cutting edge 54 of the correspondingly located stationary knife 52. The chopped or cut crop residue is then carried by rotating knives 36 and 38 (arrows C) and propelled and discharged at a high speed from combine 10 (arrow B), as explained above.

The arrangement of the knives 36 and 38 in the pairs shown in FIGS. 3 and 4, and the cutting action or function achieved in cooperation with stationary knives 52, provides a finely chopped or cut residue discharge, wherein the articles or pieces of chopped crop residue will generally have a maximum chopped extent or dimension which will fall within a desired conventionally finely chopped range as desired for some applications as noted in the background section above.

Stationary knives 50 are preferably conventionally mounted to plate 50 or otherwise securely and fixedly supported in the positions shown, so as to be conveniently and easily removable individually, or selectably, when desired or required. It is particularly desirable for alternating ones of knives 52 to be easily removable, preferably collectively, as will be discussed, also in the conventional manner. Removal of all of the stationary knives 52 may also be desired or required when harvesting corn, due to the bulkiness and difficulty in chopping the cobs of the corn, such that chopper 12 can be used to convey but not chop the corn cobs. The diverging relationship of each pair of knives 36 and 38 is advantageous in this respect, as corn cobs are less likely to become lodged between the blades due to the divergence thereof. In particular, any corn cobs that would become initially lodged between a pair of the knives 36 and 38 would tend to be dislodged by centrifugal forces acting to move the cob radially outwardly and free from the knives, as rotor 16 is rotated.

Figure 5:
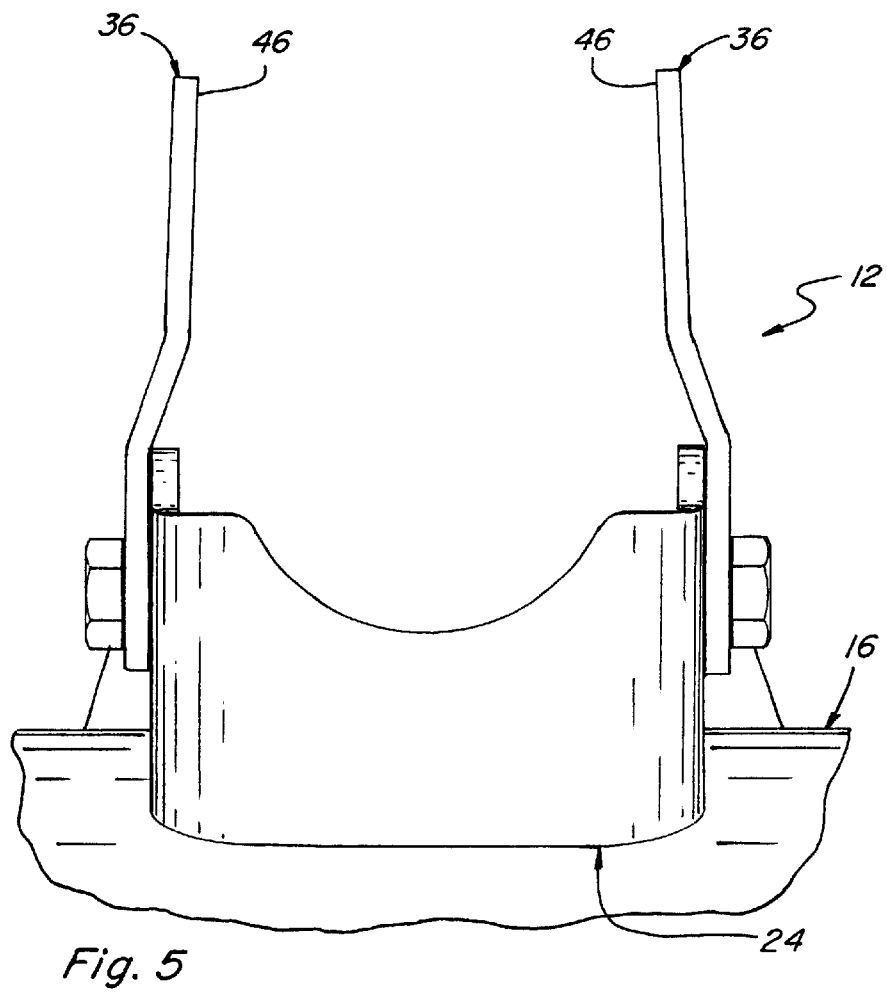
FIG. 5 is an enlarged fragmentary rear view of the rotor of FIG. 4 including knives thereon in a second configuration.
Figure 6:
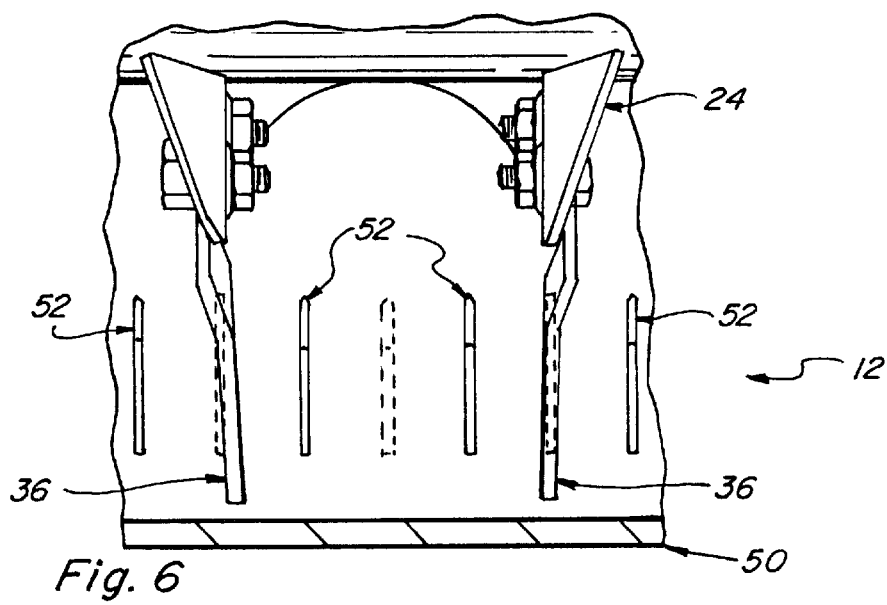
FIG. 6 is an enlarged fragmentary rear view of the chopper of FIG. 1 with the knives of the rotor thereof configured as in FIG. 5, showing relative positions of the knives of the rotor and stationary knives of the chopper.

Turning to FIGS. 5 and 6, knives 38 are shown removed from mounting brackets 24 of rotor 16, and knives 36 are shown in a reversed position on brackets 24, in a coarse chopping configuration. Additionally, only alternating stationary knives 52 are shown in place on plate 50, thereby reconfiguring chopper 12 for performing a more coarse cutting or chopping function on the crop residue such as straw and the like which passes therethrough. In this configuration, by reverse, what is meant is that knives 36 are installed in an orientation which is the reverse or opposite of the installation thereof as shown in FIGS. 3 and 4, such that free end portions 46 thereof on each mounting bracket 24 will be offset in an axial direction towards one another, so as to be positioned for passing between adjacent ones of the remaining stationary knives 52, as shown in FIG. 6. As a result, crop residue carried into contact with knives 52 will be cut or chopped into larger or coarser pieces or articles having an overall or chopped extent within an average range which will be greater or larger compared to the cuttings that would be produced by the fine chopping configuration shown in FIGS. 3 and 4.

Thus, it should be observed that chopper 12 can be configured as shown in FIGS. 3 and 4 for finely chopping or cutting crop residue received thereby, and can alternatively be configured as shown in FIGS. 5 and 6 for more coarsely chopping or cutting the residue.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A rotor for a crop residue chopper for an agricultural combine for rotation about a rotational axis extending through the rotor adjacent to an axially spaced array of stationary knives of the chopper, comprising:

a plurality of mounting elements supported in predetermined axially spaced relation one relative to another; and a plurality of offset knives, each of the offset knives including a mounting end portion fixedly mountable on one of the mounting elements and a free end portion opposite the mounting end portion disposed so as to extend radially outwardly in axially offset relation to the mounting end portion and aligned with a direction of rotation of the rotor when mounted on the mounting element, the mounting end portions of the offset knives being mountable in pairs in abutting or side by side relation on the mounting elements in a predetermined fine chopping configuration wherein the free end portions of the knives of each of the pairs are offset in a predetermined first relation to the mounting ends thereof, respectively, and define a space between the free end portions having a predetermined first axial extent for passage of the offset knives of each of the pairs on opposite sides of at least one of the stationary knives generally axially aligned with the mounting end portions of the air when the rotor is rotated for cutting any crop residue carried by the offset knives into contact with the stationary knives, and selected ones of the offset knives being mountable singly on the mounting elements in a predetermined coarse chopping configuration with the free end portions of the selected ones of the knives offset in an opposite direction from when in the fine chopping configuration so as to define axial spaces between adjacent ones of the free end portions having a predetermined second axial extent greater than the first axial extent for passage in proximity to at least one of the stationary knives when the rotor is rotated for cutting any crop residue carried by the offset knives into contact with the stationary knives.

2. The rotor of claim 1, wherein the free end portions of the knives of each of the pairs when in the fine chopping configuration are axially offset in a direction away from each other.

3. The rotor of claim 1, wherein alternating ones of the stationary knives are removed when the offset knives are in the coarse chopping configuration.

4. The rotor of claim 1, wherein the free end portions of the knives of each of the pairs when in the fine chopping configuration extend radially outwardly in diverging relation one to the other.

5. The rotor of claim 1, wherein when in the fine chopping configuration the rotor includes about twice as many of the offset knives as when in the coarse chopping configuration.

6. A crop residue chopper for an agricultural combine, comprising:

a rotor mounted in a housing of the combine for rotation about a rotational axis extending through the rotor;

a plurality of stationary knives supported in the housing in a predetermined axially extending array adjacent to the rotor, adjacent ones of the stationary knives defining axial spaces therebetween; and a plurality of offset knives, each of the offset knives including a mounting end portion fixedly mountable on the rotor and a free end portion opposite and axially offset from the mounting end portion positioned to extend radially outwardly from the rotor when the mounting end portion is mounted on the rotor, pairs of the offset knives being mountable on the rotor with the mounting end portions thereof in abutting relation and the free end portions thereof having only edge portions thereof facing in a direction of rotation of the rotor in predetermined axially aligned first offset orientations, respectively, in a predetermined first chopping configuration for passage of the pairs through the spaces between the stationary knives, respectively, when the rotor is rotated, and alternating ones of the stationary knives and the offset knives being removable and remaining ones of the offset knives being mountable on the rotor in predetermined second offset orientations opposite the first offset orientations thereof, respectively, in a predetermined second chopping configuration for passage individually through spaces between remaining ones of the stationary knives when the rotor is rotated.

7. The crop residue chopper of claim 6, wherein the free end portions of the offset knives of each of the pairs are axially offset in directions extending away from each other.

8. The chopper of claim 6, wherein the free end portions of the knives of each pair extend radially outwardly in diverging relation.

9. A crop residue chopper for an agricultural combine, comprising:

a rotor mounted in a housing of the combine for rotation about a rotational axis extending through the rotor, the rotor including a plurality of mounting elements thereon arranged in predetermined axially spaced relation one relative to another;

a plurality of stationary knives supported in the housing in a predetermined axially extending array adjacent to the rotor, adjacent ones of the stationary knives defining axial spaces therebetween;

a plurality of offset knives, each of the offset knives including a mounting end portion fixedly mounted on a mounting element of the rotor and a free end portion opposite and axially offset from the mounting end portion extending radially outwardly from the rotor in alignment with a direction of rotation of the rotor, the offset knives being mounted in pairs on the mounting members with the mounting end portions thereof in abutment and the free end portions in axially aligned predetermined first offset orientations, respectively, in a predetermined first chopping configuration for passage of the pairs of the knives through the spaces between the stationary knives, respectively, when the rotor is rotated, and alternating ones of the stationary knives and the offset knives being removable and remaining ones of the offset knives being mountable on the mounting members in predetermined second offset orientations opposite the first offset orientations thereof, respectively, in a predetermined second chopping configuration for passage individually through spaces between remaining ones of the stationary knives when the rotor is rotated.

10. The crop residue chopper of claim 9, wherein the free end portions of the offset knives of each pair are axially offset away from each other.

11. The chopper of claim 9, wherein the free end portions of the knives of each pair extend radially outwardly in diverging relation.

* * * * *